US007974938B2

(12) United States Patent
Gupta et al.

(10) Patent No.: US 7,974,938 B2
(45) Date of Patent: Jul. 5, 2011

(54) RELUCTANT EPISODIC MEMORY (REM) TO STORE EXPERIENCES OF EVERYDAY INTERACTION WITH OBJECTS

(75) Inventors: Rakesh Gupta, Mountain View, CA (US); Ken Hennacy, Columbia, MD (US)

(73) Assignee: Honda Motor Co., Ltd., Tokyo (JP)

( * ) Notice: Subject to any disclaimer, the term of this patent is extended or adjusted under 35 U.S.C. 154(b) by 795 days.

(21) Appl. No.: 11/859,034

(22) Filed: Sep. 21, 2007

(65) Prior Publication Data

US 2008/0294590 A1 Nov. 27, 2008

Related U.S. Application Data

(60) Provisional application No. 60/939,803, filed on May 23, 2007.

(51) Int. Cl.
*G06N 5/00* (2006.01)
(52) U.S. Cl. .......................................... 706/59; 706/45
(58) Field of Classification Search .................... 706/59, 706/45
See application file for complete search history.

(56) References Cited

U.S. PATENT DOCUMENTS 5,745,895 A 4/1998 Bingham et al.
2005/0271279 A1 12/2005 Fujimura et al.

OTHER PUBLICATIONS

Habetha et al, Fuzzy Rule-Based Mobility and Load Management for Self-Organizing Wireless Networks, International Journal of Wireless Information Networks, vol. 9, No. 2, Apr. 2002, pp. 119-140.*
Bentivegna, D.C. et al., "Humanoid Robot Learning and Game Playing Using PC-Based Vision", Intelligent Robots and System, Sep./Oct. 2002, pp. 2449-2454, vol. 3, IEEE/RSJ International Conference, Lausanne, Switzerland.
Bentivegna, D.C. et al., "Learning From Observation Using Primitives," Thesis, Jul. 2004, pp. 1-146, College of Computing, Georgia Institute of Technology.
Atkinson, R.C. et al., "Human memory: A proposed system and its control process," The Psychology of Learning and Motivation, 1968, pp. 117-123, 164-910, vol. 2, Academic Press.
Gupta, R. et al., "Knowledge representation and bayesian inference for response to situations," in Workshop on Link Analysis (AAAI-05), Jul. 10, 2005.
McCarthy, J. et al, "Some philosophical problems from the standpoint of artificial intelligence," [online] [Retrieved on Jan. 30, 2008], Retrieved from the Internet: <URL: http://www-formal.stanford.edu/jmc/mcchay69.html>.
Pazzani, M., "A Computational Theory of Learning Causal Relationship", Cognitive Science 15, 1991, pp. 401-424, [online] [Retrieved on Jan. 30, 2008], Retrieved from the Internet <URL: http://www.ics.uci.edu/~pazzani/Publications/cogscij.pdf>.
Schank, R.C., "Dynamic Memory: A theory of reminding and learning in computers and people," 1982, pp. 197-226, Cambridge University Press.
Steyvers, M. et al., "Inferring Causal Networks from Observations and Interventions", Cognitive Science, 2003, pp. 453-489, vol. 27, [online] [Retrieved on Jan. 30, 2008], Retrieved from the Internet <URL: http://web.mit.edu/cocosci/Papers/steyvers-etal-2003.pdf>.
Tenenbaum, J. et al., "Intuitive Theories as Grammars for Causal Inference" [online] [Retrieved on Jan. 30, 2008], Retrieved from the Internet <URL:http://web.mit.edu/cocosci/Papers/tgn-grammar.pdf>.

* cited by examiner

*Primary Examiner* — Wilbert L Starks, Jr.
(74) *Attorney, Agent, or Firm* — Fenwick & West LLP; Mark E. Duell

(57) ABSTRACT

A method and system for storing episodic sequences (events and actions). The system learns episodic sequencing by observing real-world events and actions or by receiving fact data from a database storing common sense facts. The episodic sequences are classified into events and actions, processed to indicate correlations and causality between the events and actions, and generated into linked graphs. The linked graphs may then be used to draw inferences, recognize patterns, and make decisions.

22 Claims, 11 Drawing Sheets

| | | | |
|---|---|---|---|
| Event/Action | Static Variable | Dynamic Variable | Time Stamp |
| Event 1 | Phone | Ringing | $T_1 - T_2$ |
| Action 1 | Receiver | Picked up | $T_2 - T_3$ |
| Event 2 | Phone | Silent | $T_3 - T_{11}$ |
| Action 2 | Receiver | Move to Ear | $T_3 - T_4$ |
| Action 3 | Person | Talk | $T_5 - T_6$ |
| Event 3 | Message | Sent | $T_5 - T_6$ |
| Action 4 | Person | Silent | $T_7 - T_{11}$ |
| Event 4 | Message | Received | $T_7 - T_8$ |
| Action 5 | Receiver | Move from Ear | $T_9 - T_{10}$ |
| Action 6 | Receiver | Returned | $T_{10} - T_{11}$ |

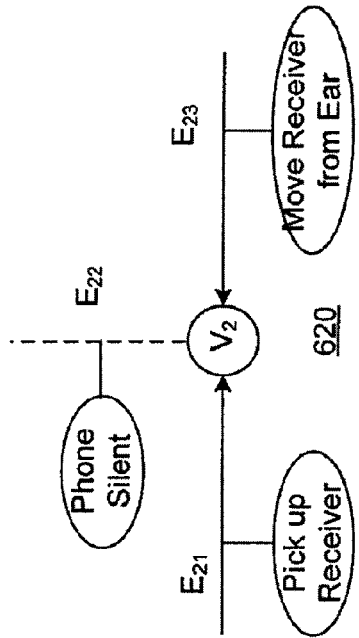
FIG. 6A
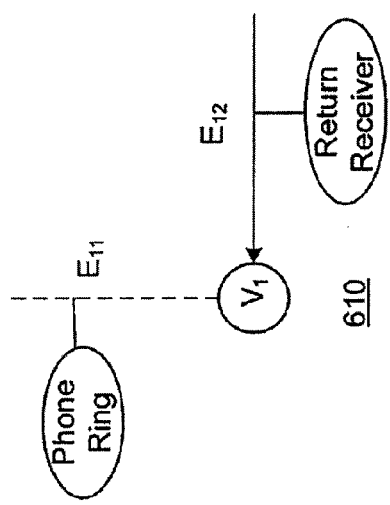
FIG. 6B
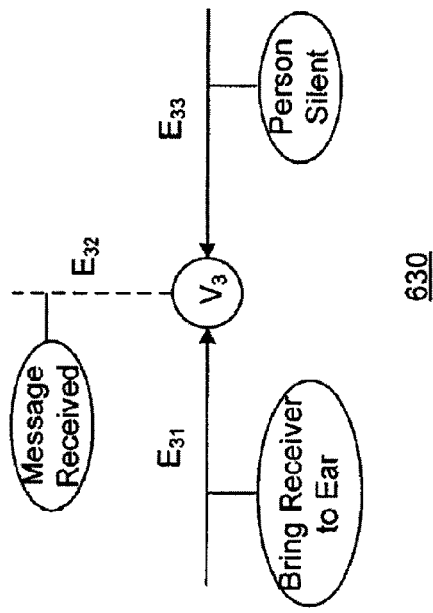
FIG. 6C
FIG. 6D

| Event/Action | Static Variable | Dynamic Variable | Time Stamp |
|---|---|---|---|
| Event 1' | Phone | Ringing | $T_{1'} - T_{2'}$ |
| Action 1' | Receiver | Picked up | $T_{2'} - T_{3'}$ |
| Event 2' | Phone | Silent | $T_{3'} - T_{11'}$ |
| Action 2' | Receiver | Move to Ear | $T_{3'} - T_{4'}$ |
| Action 3' | Person | Silent | $T_{5'} - T_{6'}$ |
| Event 3' | Message | Received | $T_{5'} - T_{6'}$ |
| Action 4' | Person | Talk | $T_{7'} - T_{11'}$ |
| Event 4' | Message | Sent | $T_{7'} - T_{8'}$ |
| Action 5' | Receiver | Move from Ear | $T_{9'} - T_{10'}$ |
| Action 6' | Receiver | Returned | $T_{10'} - T_{11'}$ |

FIG. 7A

RELUCTANT EPISODIC MEMORY (REM) TO STORE EXPERIENCES OF EVERYDAY INTERACTION WITH OBJECTS

RELATED APPLICATIONS

This application claims priority under 35 U.S.C. §119(e) to U.S. Provisional Patent Application No. 60/939,803 entitled "Reluctant Episodic Memory (REM) to Store Experiences of Everyday Interaction with Objects," filed on May 23, 2007, the subject matter of which is incorporated by reference herein in its entirety.

FIELD OF THE INVENTION

The present invention is related a method and system for storing observed episodic sequences in a computer system, more specifically to a method and system for storing observed episodic sequences and using the stored episodic sequences to organize and infer correlation and causality of events and actions.

BACKGROUND OF THE INVENTION

Cognitive science suggests that humans have distinct mechanism for short-term memory (STM) and long-term memory (LTM). The STM is memory is associated with recalling events that last from seconds to up to a few minutes, and is also called working memory. Conversely, the LTM is memory associated with recalling events from hours up to years. The LTM is typically divided into two major subclasses: declarative memory and procedural memory. The declaratory memory is all memories that are consciously available. On the other hand, the procedural memory (also known as implicit memory) is the long-term memory of skills and procedures, or "how to" knowledge.

The declaratory memory is further divided into two categories: semantic memory, and episodic memory. The semantic memory refers to the memory of meanings, understandings, and other concept-based knowledge unrelated to specific experiences. The episodic memory refers to the memory of events, times, places, associated emotions, and other conception-based knowledge in relation to an experience.

In humans, the STM stores current memory that effectively states what is currently being experienced. This experience is then transformed into something that has happened in the past in the form of the episodic memory. The semantic memory supplants the episodic memory by converting the experiences and storing them in semantic forms. The semantic memory also allows humans to learn facts from generalized information (for example, by reading books).

Humans use such different types of memory to perform various tasks. For example, performing a simple task such as pouring a glass of milk from a milk carton requires humans to use the semantic memory to recognize a glass or a milk carton, the episodic memory to recall sequences of interactions with the glass and milk carton, and procedural memory to manipulate the glass and the milk carton with hands.

Although the distinct human memory has been studied extensively, its full mechanism and interactions between the different human memory are not yet known and remain to be discovered. For example, R. C. Atkinson et al., "Human memory: A proposed system and its control process," The Psychology of Learning and Motivation, vol. 2, pp. 89-195, Academic Press, 1968, and John McCarthy et al, "Some philosophical problems from the standpoint of artificial intelligence," Machine Intelligence 4, pp. 463-502, Edinburgh University Press, 1969 describes the STM being a temporary storage for information before being transferred to the LTM for long term storage.

In traditional applications of artificial intelligence (AI) logic, different knowledge base architectures are used to implement different types of memory. The STM, the episodic memory, and the semantic memory store and retrieve information using different mechanisms. Therefore, in traditional applications, each type of memory is implemented using distinct memory subsystems. Integrating different types of memory subsystem to work together, however, proved to be a challenge to AI system builders.

A theory regarding the interrelationship between different memory subsystems was discussed, for example, in R. C. Schank, "Dynamic Memory: A theory of reminding and learning in computers," Cambridge University Press, 1982. Schank discloses storing experiences in Thematic Organization Points (TOPs) and other knowledge in Memory Organization Packets (MOPs). The MOPs and the TOPs form a script that is a sequence of English-like statements that describe various relationships between data. The data stored in the scripts may later be retrieved through search methods. Although Shank discusses the memory system functioning as episodic memory, such memory system has not been implemented, and remains theoretical.

SUMMARY OF THE INVENTION

Embodiments of the present invention provide methods and systems for storing episodic sequences of real-world events, and using the stored episodic sequences to cause intended events in the real-world. The real-world events are observed through sensors and stored in the form of clusters that represent the correlations between a subset of the observations (e.g., events and actions) of the real-world. Then the system processes the clusters to generate a linked graph that represents the correlations and causality between a set of observations including the subset of observations. The linked graph may include tags to indicate the correlations or causality of events based on reversibility of the observed events. The linked graph is then stored in a storage device to function as the episodic memory in a computer system.

In one embodiment, the system comprises a cluster generator for generating clusters based on the observations, and a graph processor for processing the clusters into the linked graph. The cluster generator generates clusters that represent observations (actions and events) of the real-world. The linked graph may be generated using the clusters available at the time the linked graph is generated.

In one embodiment, the system may comprise a database storing fact data representing correlation between the real-world events and actions in natural language. The database may provide a datastream to the cluster generator to generate clusters based on the fact data stored in the database. By using the database, the system may generate clusters for a subset of events and actions that are not observed by the sensors.

In one embodiment, each cluster comprises a decision point representing a state where an action may be started. Each cluster comprises one or more edges linked to the decision point. An edge may represent a dynamic variable of a static variable or an action. The dynamic variable is a variable that changes after performing an action, and the static variable is a variable that remains unchanged after performing the action.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present invention can be readily understood by considering the following detailed description in conjunction with the accompanying drawings.

FIGS. 6A-6D illustrates clusters for a set of observations relating to answering a phone call, according to one embodiment of the present invention.

FIG. 7A illustrates a datastream generated for another set of observations, according to one embodiment of the present invention.

DETAILED DESCRIPTION OF THE INVENTION

Figure 1:
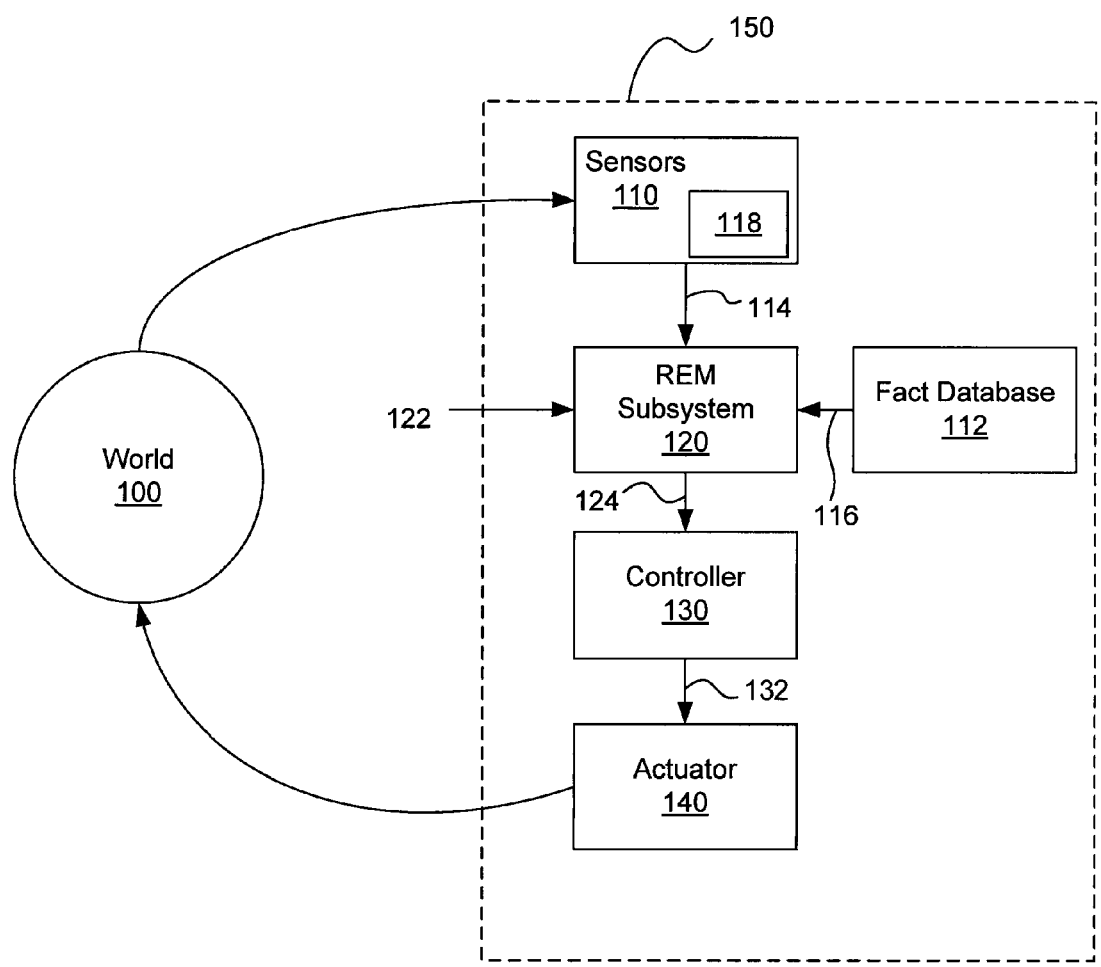
FIG. 1 illustrates a system interacting with a real-world, according to one embodiment of the present invention.

A preferred embodiment of the present invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMS, magnetic-optical disks, read-only memories (ROMs), random access memories (RAMs), EPROMS, EEPROMS, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

Embodiments of the present invention provide episodic memory for storing episodic sequences (events and actions). The memory structure may learn episodic sequences by observing real-world or by receiving fact data from a database storing common sense facts. The correlation or causality between the events and actions are automatically determined from the observations and common sense facts, and stored in the form of clusters or linked graph. The clusters represent the correlation or causality based on a subset of observations (i.e., one or two observations). The clusters are then combined and processed into a linked graph that represents the correlation or causality of a set of observations that includes the subset of observations. The linked graphs may then be used to draw inferences, recognize patterns, and make decisions.

Observations refer to sensing of episodic sequences observed within a time frame. Specifically, the episodic sequences comprise events and actions that occur within the time frame. The events and actions may be sensed using one or more sensors. For example, the observations may comprise a series of images captured by an image capturing device. Alternatively, the observations may comprise one or more statements provided in the form of natural language (for examples, a statement such as "a ringing phone becomes silent after a receiver of the phone is picked up").

The events are any observations in which changes in one or more dynamic variables are detected. The dynamic variable is a variable that changes after an action is performed. Each dynamic variable is associated with a static variable that remains unchanged after the action is performed. The static variable may be an object (e.g., a phone) or a motion (e.g., walking) that remain the same before and after an action was performed. For example, when an action of picking up a phone is performed, a phone (static variable) that rings (a first state of a dynamic variable) becomes silent (a second state of the dynamic variable). The fact that the receiver is picked up (action) does not change the fact that the ringing object is a phone (static variable).

An action refers to any process or motion that causes changes in one or more dynamic variables. The action may be paired with a reverse action. For example, an action of "pulling" is a reverse action of "pushing" and vice versa.

A cluster is the data of a graphic representation that comprises events and actions of a subset of available observations. One or more clusters are generated when an event or an action is observed. For example, when a lamp is turned on after a door is open, a first cluster is generated to indicate a state where the lamp is turned on, and a second cluster is generated to indicate a state where the lamp is turned off. The two clusters may be associated by a first action (opening the door) and a second action (closing the door) that is the reverse action of the first action. Each cluster may include one decision point and one or more edges representing the state of the dynamic variables of static variables and actions.

A decision point is a state where a decision can be made to start an action. For example, when answering a phone, a person may hear the phone ringing, pick up the receiver of the phone, move the receiver to the person's ear, remain silent to receive a message, and then talk to send a message. In this example, decisions may be made in each step: (a) answer the phone (first decision), (b) move the phone to the person's ear (second decision), (c) talk to the receiver (third decision), or (d) remain silent (fourth decision). One or more actions may be taken at each decision point.

An edge is a component of the cluster that represents a dynamic variable of a static variable or an action. The cluster may include one or more edges. The edges linked to the decision points indicate the dynamic variables, and actions that may be associated with the state represented by the cluster.

A linked graph is a graphical representation of events and actions processed to indicate correlations or causality between a set of observations that include a subset of observation represented by a cluster. The linked graph may be generated by attaching tags to the edges of the clusters. The decision points of the clusters may be merged to resolve discrepancies in the decision points of the clusters.

Reluctance refers to not setting a fixed set of the causality or correlation between events and actions based on a set of observations. In the embodiments of the present invention, the linked graphs are updated or reconstructed if additional clusters based on additional observations become available. That is, the causality or correlations of events and actions change as additional observations become available. Using such reluctance, the embodiments may identify causality and correlations that would otherwise be unidentifiable.

Reversibility refers to whether the state of the dynamic variable is returned to a previous state by performing a reverse action. For example, a door is designed to turn on (dynamic variable) a lamp (static variable) when closed (action), and turn off (dynamic variable) the lamp when opened (reverse action). The event of turning the lamp on is reversible because by performing a reverse action (opening the door) to an action (closing the door) that turned on the lamp in the first place, the state of the dynamic variable is returned to the previous state (lamp off) before taking the action (closing the door). Such events as pouring water from a glass is irreversible because water poured from the glass is not filled back in the glass when the glass is turned back to a non-tilted state. The reversibility may be used to establish the correlation and causality of the events.

An effector is any device that may effect changes in physical properties of real-world objects. The effector, among other devices, includes an actuator, a display device, a robot, a manipulator, a vehicle, a machining center, and an appliance. The effectors may be operated to cause events in the real-world as determined by the linked graph.

Overview of Interaction Between System and Real-World

FIG. 1 illustrates a system 150 interacting with a real-world 100, according to one embodiment of the present invention. The system 150 includes, among other components, sensors 110, a reluctant episodic memory (REM) subsystem 120, a controller 130, an actuator 140, and a fact database 112. The sensors 110 detect the events and actions in the real-world 100 and provide its sensor signals 114 to the REM subsystem 120. The REM subsystem 120 generates the clusters and the linked graph, as described below in detail with reference to FIGS. 6A to 6E.

The system 150 may be various types of system that learn from observations of the real-world 100 and make decisions or inference based on such observations. The system 150 may be, for example, a robot designed to perform one or more tasks, a vehicle with an automatic navigation system, a factory management system that observes process parameters and control processes, an operating system that detects operations of a computer device and control its operations, a motion recognition system that recognizes motions and react to the recognized motions, a building automation system that detects and parameters and controls various equipments in a building.

The REM subsystem 120 also receives a target event signal 122 indicating the events to be caused by the system 150. In one embodiment, the target event signal 122 is provided by a user. In another embodiment, the external input 122 is provided by a separate artificial intelligence (AI) system or a planning module that manages the operation of the system 150.

In response to the target event signal 122, the REM subsystem 122 generates an actuator command 124 instructing the controller 130 to perform certain actions. The controller 130 then generates an effector signal 132 to control the actuator 140. The actuator 140 then operates to perform actions according to the effector signal 132.

In one embodiment, the REM subsystem 120 is also coupled to a fact database 112. The fact database 112 provides common sense facts 116 to the REM subsystem 120 to supplant the sensor signal 114 so that the REM subsystem 120 may generate the clusters and linked graphs for events and actions that are not observed by the sensors 110. In one embodiment, the fact database 112 includes the statements of common sense facts in natural language. For example, the fact database 112 is a data source such as Open Mind Common Sense, which is an artificial intelligence project based at the Massachusetts Institute of Technology (MIT) Media Lab of Cambridge, Mass. The fact data 116 is formatted into a datastream before being provided to the REM subsystem 120, as described below in detail with reference to FIG. 5.

One or more types of sensors may be used either by itself or in combination with other sensors. The sensors 110 comprises, among other devices, image capturing devices (e.g., video cameras), sound detection devices (e.g., microphone), mechanical or electrical switches, proximity sensors, temperature sensors, gyroscopes, and rotary encoders. Certain sensors may be dedicated to recognizing one event or action while other sensors may detect multiple events and actions.

In one embodiment, the sensors 110 also includes a motion recognition subsystem 118 coupled to the image capturing device for identifying and recognizing the motions taken by a subject in the real-world 100. For example, the sensors 110 may identify various gestures and signs using computer vision, for example, as disclosed in U.S. Patent Application Publication No. 2005/0271279 entitled "Sign Based Human-Machine Interaction," which is incorporated by reference herein in its entirety. The motion recognition subsystem 118 provides the recognized motion as the sensor signals 114 to the REM subsystem 120.

Architecture of REM Subsystem

Figure 2:
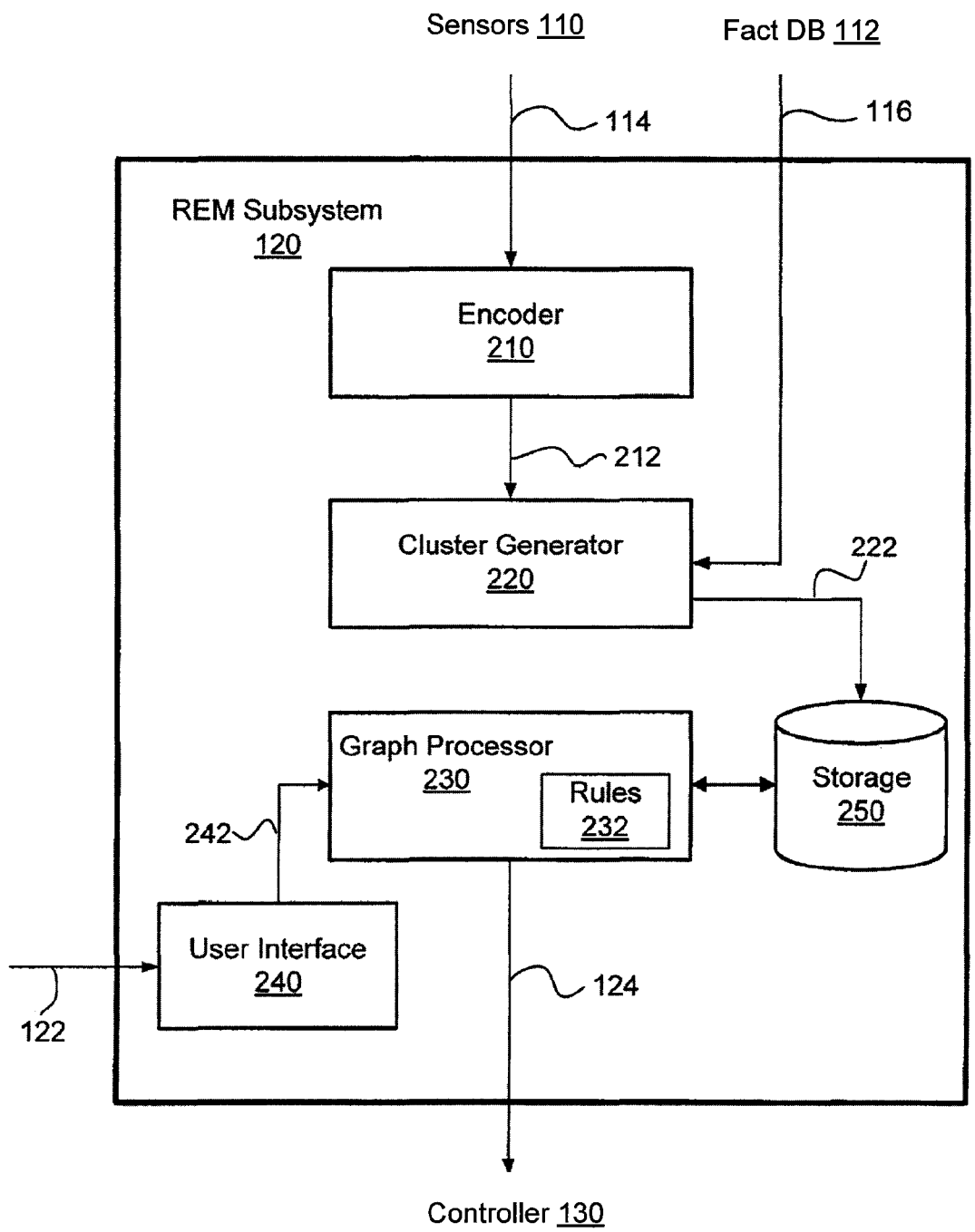
FIG. 2 illustrates a block diagram of a reluctant episodic memory (REM) subsystem, according to one embodiment of the present invention.

FIG. 2 illustrates a block diagram of a reluctant episodic memory (REM) subsystem 120, according to one embodiment of the present invention. The REM subsystem 120 includes, among other components, an encoder 210, a cluster generator 220, a graph processor 230, a storage device 250, and a user interface 240. The encoder 210 is coupled between the sensors 110 and the cluster generator 220. The cluster generator 220 is coupled between the encoder 210 and the storage device 250. The cluster generator 220 is also coupled to the fact database 112. The cluster generator 220 is coupled to the storage device 250 to store clusters generated from the datastream 212. The graph processor 230 is coupled to the storage device 250, the user interface 240, and the controller 130. The functions of each component of the REM subsystem 120 are described below in detail.

The encoder 210 receives the sensor signals 114 and generates the datastream 212 that is adapted for processing by the cluster generator 220. The sensor signals 114 may be different types of signals that are incompatible with the cluster generator 220. Therefore, the encoder 210 converts the sensor signals 114 into the datastream 212 identifying and classifying events and actions in the real-world 100, as described in detail below with reference to FIGS. 4 and 5.

The cluster generator 220 receives the datastream 212 from the encoder 210 and generates the clusters 222 for the events and actions observed by the sensors 110. The generated clusters 222 are stored in the storage device 250 for retrieval by the graph processor 230. Specifically, after detecting an event in the entry of the datastream 212, the cluster generator 220 generates two clusters, a first cluster indicating a state before the event occurred, and a second cluster indicating a state after the event occurred. The cluster generator 220 also determines an action that occurred in the same time frame as the event and assigns the action to the second cluster. The first cluster is assigned with a second action that is the reverse action of the first action.

The graph processor 230 retrieves the clusters 222 from the storage device 250 and generates a linked graph, as described below in detail with reference to FIG. 6E. In one embodiment, the graph processor 230 generates the linked graph after receiving a request from a user or a target event signal 122 via the user interface 240. After receiving the request from the user or the target event signal 122, the graph processor 230 generates the linked graph based on the clusters 222 stored in the storage device 250. In one embodiment, the linked graph is updated incrementally as the additional clusters become available from the cluster generator 220 to reduce the lag time between receiving the target event signal 122 and generation of the linked graph.

During the generating of the linked graph, the graph processor 230 may merge the decision points of the clusters 222 to resolve discrepancies, identify correlations of the events and actions, attach tags representing correlations between the events and actions, and eliminate duplicative clusters 222, according to a set of rules 232. The set of rules 232 are described below in detail with reference to FIG. 6E. The graph processor 230 then uses the linked graph to generate actuator commands 124 to invoke actions of the actuator 140 to cause the events intended by the target event signal 122. The linked graph may also be used for making inferences, making decisions, making predictions and recognizing patterns in the linked graph.

In one embodiment, the REM subsystem 120 includes a user interface 240 for receiving user inputs including, for example, the target event signal 122. The user interface 240 is coupled to the graph processor 230 to issue user commands 242 to the graph processor 230. The user commands 242 include commands for: instructing the graph processor 230 to generate the linked graph, instructing the graph processor 230 to generate the actuator commands 124, deleting all or selected clusters 222 stored in the storage device 250, making predictions based on the linked graph, and modifying the rules 232 for generating the linked graphs.

Cluster and its Elements

Figures 3, 4, 5:
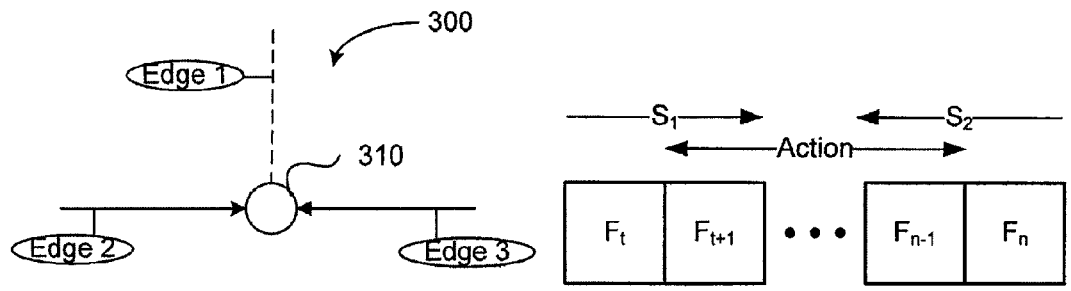
FIG. 3 illustrates a cluster including a decision point and edges linked to the decision point, according to one embodiment of the present invention.
FIG. 4 illustrates a series of sensor inputs generated by sensors, according to one embodiment of the present invention.
FIG. 5 illustrates a datastream generated by an encoder for a set of observations, according to one embodiment of the present invention.

FIG. 3 illustrates a cluster 300 including a decision point 310 and three edges (Edge 1, Edge 2, and Edge 3) linked to the decision point 310, according to one embodiment of the present invention. The decision point 310 indicates a point (or a state) where the system 150 may take an action to move to another state represented by another cluster adjacent to the cluster 300.

There are two types of edges: variable edges and action edges. The variable edges represent the states of the dynamic variable associated with static variables. The action edges have arrows at the end and represent the actions that results in the state represented by the cluster.

Formatting the datastream 212 into the cluster as illustrated in FIG. 3 is advantageous because it allows the REM subsystem 120 to handle different types of inputs. In the example of FIGS. 1 and 2, the REM subsystem 120 receives and processes two different types of inputs: the sensor inputs 114 from the sensors 110, and the fact data 116 from the fact database 112. The sensor inputs 114 may correspond to the short-term memory (or working memory) of humans. On the other hand, the fact data 116 may correspond to the semantic memory of humans. After the sensor inputs 114 and the fact data 116 are formatted into the clusters 222, the clusters may be processed into the linked graph in the same manner despite the differences in the source and format of the data used for generating the clusters 222.

In the example of FIG. 3, the state represented by the cluster 300 is reached either by a first action represented by Edge 2, or by a second action represented by Edge 3. To avoid confusion, lines with arrows are used throughout the Figures to indicate edges associated with actions that result in the states represented by the clusters pointed by the arrows. After taking actions from the decision points of the clusters (not shown) adjacent the cluster 300, the dynamic variable of the real-world 100 changes to the state represented by the cluster 300.

A dashed line illustrated in the example of FIG. 3 represents a state of the dynamic variable. The dynamic variable is a variable that changes its state when the actions are taken. In the example of FIG. 3, the actions represented by Edge 2 or Edge 3 change the dynamic variable to the state represented by Edge 1.

The cluster 300 illustrated in FIG. 3 is merely illustrative. More or less number of edges may be linked to a decision point. More than one edge may be linked to the decision point to indicate other dynamic variables. Also, additional edges may be employed to show the static variable associated with the dynamic variable that is being changed by the action. Alternatively, the static variable associated with the dynamic variable may also be added as separate edges stemming from the decision point.

Although the clusters are shown in the form of graphic representations, the clusters of the present invention are not limited to the graphical representations. The clusters may be implemented, stored, and retrieved in other forms of data including, for example, tables or vectors. Such data representing the clusters may be stored, for example, in a relational database.

Datastream Generation and its Format

FIG. 4 illustrates a series of sensor inputs 114 including data for events and data, according to one embodiment of the present invention. The sensor inputs 114 are provided to the encoder 210 in the form of frames ($F_t, F_{t+1}, \ldots, F_{n-1}, F_n$) that include sensor inputs from different sensors with time stamps. Each frame includes information of states of the dynamic variables and other variables (indicative of actions) at the time of the frame. The frame may also include time stamps indicating the time when the frame was generated.

In the example of FIG. 4, the state of the dynamic variable is $S_1$ until an action is taken. While the action is being performed, the state of the dynamic variable changes to $S_2$. Specifically, the dynamic variable remains $S_1$ in frame $F_t$ and $F_{t+1}$ but changes to S2 at frame $F_{n-1}$. The actions are detected in frames $F_{t+1}$ to $F_{n-1}$. Based on the timing of the changes in the dynamic variable and changes in other variables indicating the actions, the encoder 210 may generate the datastream 212.

In one embodiment, the variable indicating the actions is sensed using the motion recognition subsystem 118 of the sensors 110. The sensors 110 determine the motions and generate motion information identifying the recognized motions (i.e., actions). The motion information is then included in the sensor inputs in the form of frames ($F_t, F_{t+1}, \ldots, F_{n-1}, F_n$) as illustrated, for example, in FIG. 4.

FIG. 5 illustrates a structure of the datastream 212 formatted by the encoder 210, according to one embodiment of the present invention. The encoder 210 reads the frames ($F_t, F_{t+1}, \ldots, F_{n-1}, F_n$) of the sensor signals 114 and generates the datastream 500 having, among others, entries for: an event/action field 510, a static variable field 520, a dynamic variable field 530, and a time stamp field 540. The event/action field 510 identifies whether the entry represents data on events (i.e., changes in the dynamic variables) or actions. The static variable field 520 identifies the static variable that is associated with the dynamic variable in the dynamic variable field 530. The dynamic variable field 530 indicates either an action that is being performed by the static variable (if the entry indicates an action) or the state of the dynamic variable associated with an event (if the entry indicates an event). The time stamp field 540 includes the information on when each event or action was observed. The data structure of the datastream 212 is merely illustrative. Different formats may be used. For example, the static variable field 520 and the dynamic variable 530 may be merged.

In the example of FIG. 5, the datastream 500 is generated from a set of observations related to a person answering a phone. In this example, the sensors 110 observe an episodic sequence in which the person picks up the phone, moves the receiver to his ear, talks over the receiver to send the message, and then remains silent to receive the message.

The datastream 500 generated by the encoder 210 includes an entry for Event 1 related to the phone ringing detected from time $T_1$ to $T_2$. The next entry of the datastream 500 indicates Action 1 of a person picking up the phone from time $T_2$ to $T_3$. This is followed by an entry indicating Event 2 where the phone stops ringing and becomes silent from time $T_3$ to $T_{11}$. The next entry of the datastream 500 indicates Action 2 where the person moves the receiver to his ear during time $T_3$ to $T_4$. A subsequent entry indicates that the person talks to the receiver from time $T_5$ to $T_6$ (Action 3). The next entry indicates Event 3 where a message is sent concurrently with performing of Action 3. The next entry indicates Action 4 where the person becomes silent from time $T_7$ to $T_{11}$ after sending the message, followed by an entry indicating Event 4 where the message is received from time $T_7$ to $T_8$. The subsequent entry indicates that the person is moving the receiver away from his ear (Action 5) during time $T_9$ to $T_{10}$. Then the final entry indicating that the receiver is returned to the phone (Action 6) during time $T_{10}$ to $T_{11}$.

Example of Clusters and Linked Graph

The episodic sequence of the person answering the phone as illustrated in the datastream 500 of FIG. 5 is used to describe an example of generating the clusters and the linked graph. In this example, the sensors 110 comprise a first microphone to detect whether the phone is ringing or silent, image capturing devices and motion recognition system 118 to detect the motions taken by a person using the phone, a second microphone to detect whether the person is silent or talking, two switches manually operated by the person to indicate whether a message is being sent or receive by the phone. The person presses a switch indicating to the system 150 that he is sending the message when speaking through the receiver to the caller. Conversely, the person presses a switch indicating to the system 150 that he is receiving the message when he is listening to the caller speak.

FIG. 6A illustrates a cluster 610 representing, among other observations, an observation related to the phone ringing. The decision point $V_1$ of FIG. 6A indicates that a decision may be made to perform Action 1 of picking up a receiver (represented by an edge $E_{21}$ in FIG. 6B). Event 1 associated with the phone ringing is represented by an edge $E_{11}$ where the dynamic variable is "ringing" and the static variable is a "phone." An edge $E_{12}$ represents Action 6 of "returning the receiver" that restores the state represented by the cluster of FIG. 6B to the state represented by the cluster of FIG. 6A.

FIG. 6B illustrates a cluster 620 representing, among other observations, an observation related to the phone becoming silent after the person picks up the receiver of the phone (Action 1). The cluster 620 includes a decision point $V_2$ from which either Action 2 to bring the receiver to the ear (represented by an edge $E_{31}$ of FIG. 6C) or Action 6 to return the receiver to the phone (represented by an edge $E_{12}$ of FIG. 6A) may be performed.

The state represented by the cluster 620 may be reached by performing Action 1 of picking up the phone (represented by the edge $E_{21}$) from the state represented by the cluster 610 or performing Action 5 of moving the receiver from the ear (represented by the edge $E_{23}$) from the state represented by a cluster 630 of FIG. 6C. After performing Action 1, Event 2 is observed where the ringing of the phone stops and becomes silent (represented by an edge $E_{22}$).

The dynamic variable associated with the edge $E_{22}$ is "silent" and the static variable associated with the edge $E_{22}$ is the "phone." The clusters 610 and 620 share the same static variable. Therefore, a negative correlation is established between the "ringing" and "silent," as described in detail below with reference to FIG. 6E.

FIG. 6C illustrates the cluster 630 representing, among other observations, an observation related to the receiver being brought to the person's ear (Action 2) and receiving the message via the receiver. The cluster 630 includes a decision point $V_3$ from which Action 2 of moving the receiver from the person's ear (represented by an edge $E_{23}$) or Action 3 of the person talking over the receiver (represented by an edge $E_{41}$) may be performed.

The state represented by the cluster 630 is reached by Action 2 of bringing the receiver to the ear (represented by an edge $E_{31}$) from the state represented by the cluster 620 or Action 4 of the person becoming silent (represented by an edge $E_{33}$) from the state represented by the cluster 640. In the state represented by the cluster 630, the message is received (represented by an edge $E_{32}$) by the person becoming silent (represented by the edge $E_{33}$).

FIG. 6D illustrates the cluster 640 representing, among other observations, an observation related to the person talking over the receiver (Action 3) to send a message to the caller. The cluster 640 includes a decision point $V_4$ from which Action 4 of the person becoming silent (represented by an edge $E_{33}$) may be taken. The state represented by the cluster 640 is reached by performing Action 3 of the person taking over the receiver (represented by the edge $E_{41}$) from the state represented by the cluster 630 of FIG. 6C. In the state represented by the cluster 640, the person talks to the caller (Action 3) and the message is sent to the caller (represented by an edge $E_{42}$).

The clusters 630, 640 share the same static variable "message" but the states of the dynamic variable (received, sent) are different. Therefore, a negative correlation is established between the two states of the dynamic variable (received, sent), as described below in detail with reference to FIG. 6E.

After the person finishes talking, the person may decide (at the state represented by the cluster 640) to take Action 4 of becoming silent (represented by the edge $E_{33}$). By performing Action 4 from the state represented by the cluster 640, the state of the real-world 100 changes to the state represented by the cluster 630. From the state represented by the cluster 630, the person may perform Action 3 of talking to the receiver (represented by the edge $E_{41}$) and thereby return to the state represented the cluster 640 or take Action 5 of removing the receiver from the ear (represented by the edge $E_{23}$). The person may then decide at the decision point $V_2$ of cluster 620 to perform Action 6 of returning the receiver to the phone (as represented by the edge $E_{12}$) to change the state of the real-world 100 to the state represented by the cluster of FIG. 6A. Alternatively, the person may decide at the decision point $V_2$ to perform Action 2 of moving the receiver to the ear (as represented by the edge $E_{31}$) to change the state of the real-world 100 to the state represented by the cluster 630.

In one embodiment, the clusters of FIGS. 6A-6D are generated by the cluster generator 220, and then stored in the storage device 250 for retrieval by the graph processor 230. In one embodiment, redundant or duplicative clusters are not stored in the storage device 250.

The graph processor 230 then uses the set of rules 232 to generate the linked graphs. The set of rules include, among others, the following: First, if the states of the dynamic variable for the same static variable are different in adjacent clusters (i.e., clusters linked by action edges), the two states of the dynamic variable are negatively correlated (i.e., the two states of the dynamic variables cannot coexist and are mutually exclusive). Referring to FIGS. 6A and 6B, for example, the cluster 610 has a dynamic variable of "ringing" for a static variable "phone," and the cluster 620 has a dynamic variable of "silent" for the static variable "phone." Therefore, "ringing" and "silent" are states of the dynamic variable that cannot coexist and are negatively correlated.

Second, all of the actions and the states of the dynamic variables in the same clusters are positively correlated. Referring to FIG. 6B, the three edges ($E_{21}$, $E_{22}$, and $E_{23}$) are positively correlated. Therefore, the action of picking up the receiver ($E_{21}$), the phone being silent ($E_{22}$), and moving the receiver from the ear ($E_{23}$) were observed as having occurred together. In other words, observing one (picking up the receiver, phone being silent, or moving the receiver) increases the probability of the rest being observed as well.

Third, if an irreversible event is detected, the correlations or causal relationship between the actions and the events are broken. That is, the links between the clusters are modified, as described in detail below with reference to FIGS. 8A and 8B. The irreversible events are detected when the change in the state caused by performing an action is not returned by performing the reverse action of the action changing the state.

Fourth, if the observations are contradictory, then the edges of the related observations are tagged to indicate uncertain correlations. For example, if an action changes a state of the dynamic variable in one observation but not in another observation, the correlation between the action and the dynamic variable is uncertain. Therefore, the linked graphs are tagged to indicate the uncertain correlations between the action and the dynamic variable.

Figure 6E:
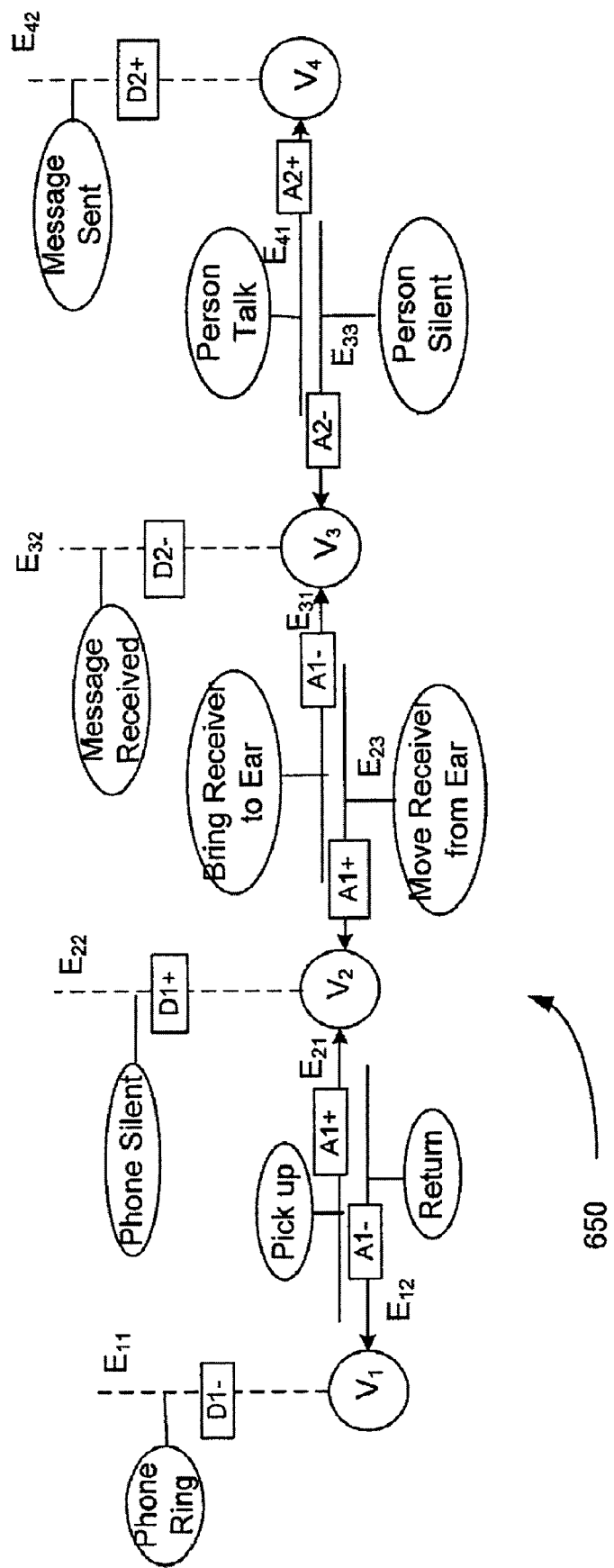
FIG. 6E illustrates a linked graph generated from the clusters of FIGS. 6A-6D, according to one embodiment of the present invention.

Using this set of rules 232, the clusters 610 to 640 of FIGS. 6A-6D are processed into the linked graph 650 as illustrated in FIG. 6E. In FIG. 6E, the tags are shown as small rectangular boxes. The tags starting with the letter "D" are associated with the dynamic variables, and tags starting with the letter "A" are associated with actions. The numbers appearing in the tags indicate the identification of the correlations. That is, the edges with the same numbers in the tags are correlated either positively or negatively. The plus (+) or minus (−) sign appearing in the tags indicate the correlation between the dynamic variables and the actions. That is, the edges having tags with the same sign are positively correlated and the edges having tags with the opposite signs are negatively correlated.

As described above with reference to FIGS. 6A and 6B, the states of the dynamic variable ("ringing" and "silent") of the static variable ("phone") are different in the adjacent clusters. Therefore, the edge $E_{11}$, (tag: D1−) and the edge $E_{22}$ (tag: D1+) are negatively correlated using the first rule of the set of rules 232. Also, the edge $E_{12}$ is included in the same cluster as edge $E_{11}$. Therefore, the edge $E_{12}$ and the edge $E_{11}$ are positively correlated using the second rule of the set of rules 232. The edge $E_{21}$ indicates a reverse action of the action represented by the edge $E_{12}$; and therefore, they are negatively correlated. The edge $E_{21}$ is included in the same cluster as the edge $E_{22}$. Therefore, the edge $E_{21}$ is positively correlated with the edge $E_{22}$ using the second rule of the set of rules 232.

The clusters 620, 630 are linked by Action 2 of moving the receiver to the ear (represented by the edge $E_{31}$) and the reverse action (Action 5) of moving the receiver away from the ear (represented by the edge $E_{23}$). Action 2 and Action 5 are negatively correlated (shown as tag: A1+ and tag: A1−) because Action 5 (represented by the edge $E_{23}$) is a reverse action of Action 2 (represented by the edge $E_{31}$). In the clusters 620 and 630, the edges $E_{22}$ and $E_{32}$ are not correlated because the static variable (phone) in the edge $E_{22}$ is different from the static variable (message) in the edge $E_{32}$.

Similarly, the clusters of FIGS. 6C and 6D are linked by Action 3 of the person talking over the receiver (represented by the edge $E_{41}$) and Action 4 of the person being silent (represented by the edge $E_{32}$). Because the static variable (message) in the adjacent clusters 630, 640 is the same, the edges $E_{32}$ and $E_{42}$ are tagged to indicate a negative correlation using the first rule of the set of rules 232. The edge $E_{41}$ and the edge $E_{42}$ are tagged to indicate a positive correlation because they are in the same cluster using the second rule of the set of rules 232. The edge $E_{33}$ and the edge $E_{32}$ are also tagged to indicate a positive correlation because these two edges are also in the same cluster.

As additional observations become available, a different linked graph may be generated by the graph processor 230. Assume, for example, that the sensors 110 observes another episodic sequence in which the person picks up the phone, moves the receiver to his ear, but remains silent (instead of talking) and thereby receives the message before talking to send the message. The additional set of observations is different from the set of observations described above with reference to FIG. 5 in that the sequence of the person remaining silent and the person talking is reversed.

FIG. 7A illustrates the datastream 700 generated based on the additional set of observations. The datastream 700 generated for this additional set of observations is essentially identical to the datastream 500 of FIG. 5 except that the entries for Action 3' to Event 4' have a different sequence as indicated by a box 702. The entry for Action 3' representing the person remaining silent follows the entry for Action 2' representing the person moving the receiver to the person's ear. The entry for Event 3' of receiving the message from the caller then follows. The entry for Action 4' of the person talking follows the entry for Event 3'. The entry for Event 4' of the message being sent follows the entry for Event 3'.

Figures 7B, 7C, 7D:
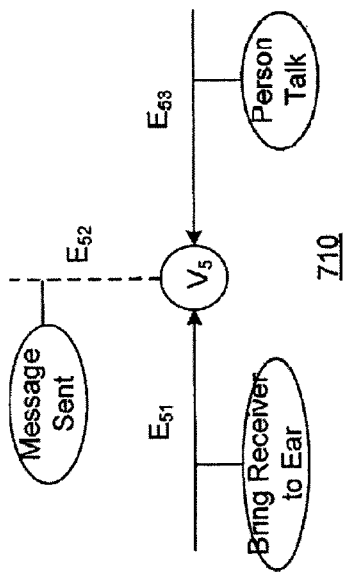
FIGS. 7B and 7C illustrate clusters generated for the datastream of FIG. 7A, according to one embodiment of the present invention.
FIG. 7D illustrate a linked graph generated using the clusters of FIGS. 7B and 7C, according to one embodiment of the present invention.

FIGS. 7B and 7C illustrate clusters generated for the events and actions represented by the box 702 of the datastream 700. The cluster generator 220 also generates the clusters 610 and 620 from the datastream 700 because the sequence for the clusters 610 and 620 are the same in the datastream 700. The clusters 630, 640, however, are not generated. Instead, clusters 710 and 720 of FIGS. 7B and 7C are generated because of the difference in the episodic sequence in the datastream 700. The cluster 710 is different from the cluster 630 in that the cluster 710 includes an edge $E_{52}$ representing the message being sent (as opposed to the edge $E_{32}$ of FIG. 6C representing the message being received) and an edge $E_{53}$ representing Action 4' of the person talking (as opposed to the edge $E_{33}$ of FIG. 6C representing the person becoming silent). Likewise, the cluster 720 has similar differences compared to the cluster 640 of FIG. 6D.

FIG. 7D is a diagram illustrating the updated link graph, according to one embodiment of the present invention. Based on the additional clusters 710, 720 from the datastream 700, the graph processor 230 modifies the linked graph 650 to obtain the linked graph 730 or reconstructs the linked graph 730 anew from the clusters 610, 620, 630, 640, 710 and 720. After determining that the clusters 710, 720 are inconsistent with the clusters 630, 640, the graph processor 230 resolves the inconsistencies by merging the decision points of the clusters 630, 640, 710, 720. That is, the inconsistencies are resolved by merging the decision points $V_3$, $V_4$, $V_5$ and $V_6$ into a single decision point $V_7$, thereby generating the linked graph of FIG. 7D.

The linked graph 7D is essentially the same as the linked graph of FIG. 6E except that it has one less decision point, and the decision point at the right end has four actions and two states associated with it. The portions of the linked graph of FIG. 7D identical to the linked graph of FIG. 6E is not described for the sake of clarity and brevity.

The merged decision point $V_7$ in FIG. 7D represents that a decision may be made to perform one of the three actions: (a) move the receiver from the ear (represented by the edge $E_{23}$), (b) talk to the caller (represented by the edge $E_{41}$) and send the message (represented by the edge $E_{42}$), and (c) become silent (represented by the edge $E_{33}$) and receive the message (represented by the edge $E_{32}$).

If the person decides to take actions (b) or (c), the state returns to the merged decision point $V_7$ where any of the three actions (a) to (c) may again be performed. Therefore, the edges $E_{41}$ and $E_{33}$ are shown as circular arrows starting from the decision point $V_7$ and ending at the same decision point $V_7$.

The merging of the decision points is an example of using the reluctance to infer causality between the actions and events. The graph generator 230 does not commit to the causality or correlations established by the linked graph 650 of FIG. 6E based on a set of observations. Instead, the graph generator 230 generates another linked graph 730 or updates the linked graph 730 as additional observations become available. Therefore, the correlations or causality not determinable or incorrectly determined based on one set of observations may be determined or corrected based on additional observations.

The linked graph 730 may be used to cause an intended event. Assume that the actuator 140 is constructed so that all of the actions in the linked graph 730 may be performed. If the sensors detect the phone ringing (an event represented by the edge $E_{11}$) and the user interface 240 receives the target event signal 122 indicating receiving of the message (an event represented by the edge $E_{32}$), the graph processor 232 determines which actions must be performed to obtain the dynamic variable as represented by the edge $E_{32}$.

Specifically, the graph processor 232 determines that the final decision point $V_7$ must be reached via the decision points $V_1$ and $V_2$ by sending the actuator commands 124 to pick up the phone (as represented by the edge $E_{21}$), and then bring the receiver to the ear (as represented by edge $E_{31}$), and remaining silent (represented by the edge $E_{33}$) that is positively correlated with receiving the message (as represented by the edge $E_{32}$).

The system 150 may also modify and reconstruct the linked graph while performing actions to achieve the event intended by the target event signal 122. The observations obtained by the sensors 110 during the operation may again be used to modify or reconstruct the linked graph that more accurately reflects the actually correlation and causality of the events and actions in the real-world 100. The system 150 may then take actions according to the modified or reconstructed linked graph.

As described above with reference to the clusters and linked graphs of FIGS. 6A to 6E and 7B to 7C, the REM subsystem 120 determines the correlation and causality of events and actions based on the observations made by the system 150. The REM subsystem 120 automatically modifies or reconstructs the correlation and causality of events and actions as additional observations become available. Further, the system 150 takes advantage of the fact database 112 to obtain information of observations that is not obtained from the sensors 110. Therefore, the system 150 does not require extensive human intervention to learn the correlation and causality of events and actions.

Example of Irreversibility and Inference of Causality

An event is irreversible when a reverse action (opposite to an action) does not return the dynamic variable to the state changed by the action. The irreversibility may be used to determine the correlations and causality between the events and the actions. That is, the presence of certain causality or correlations may be negated using the irreversibility.

Figure 8A:
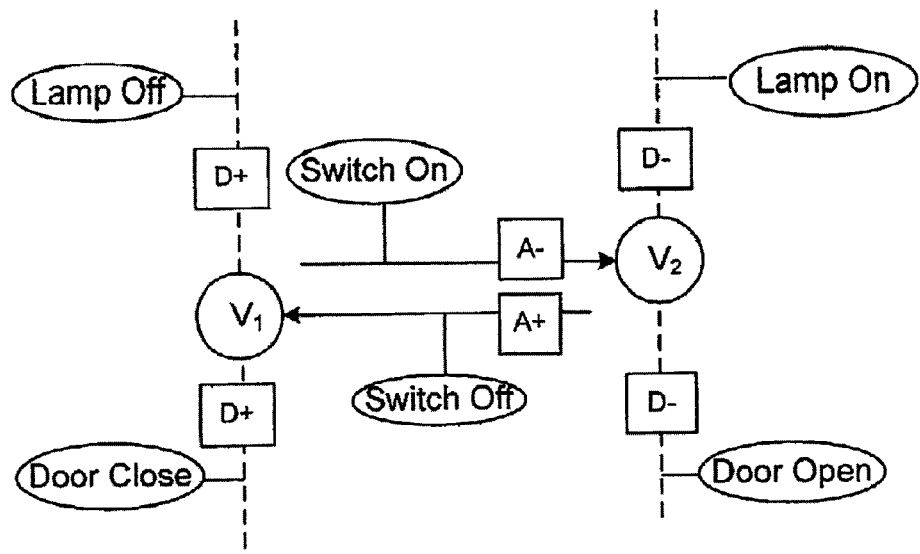
FIG. 8A illustrates two decision points in a linked graph associated by actions before observing an irreversible event, according to one embodiment of the present invention.
Figure 8B:
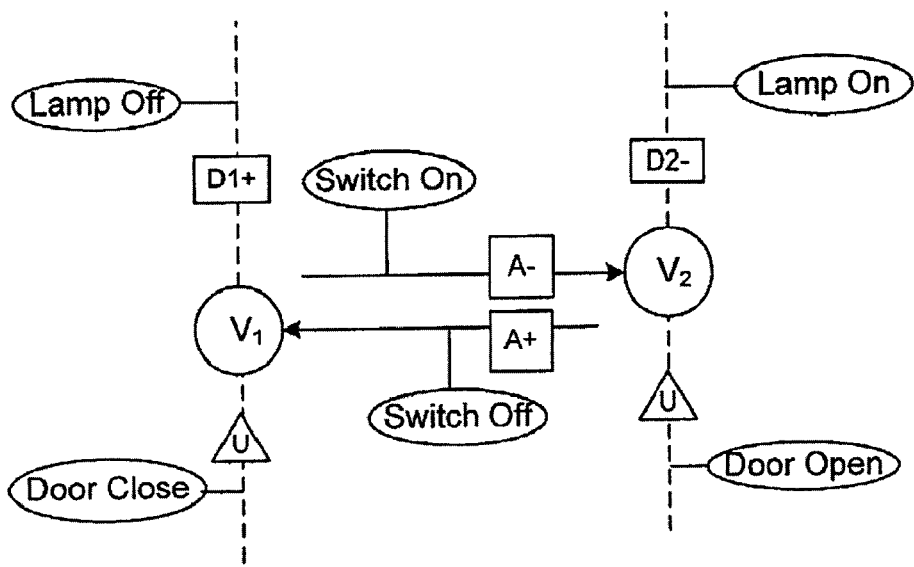
FIG. 8B illustrates two decision points of the linked graph of FIG. 8A after observing the irreversible event, according to one embodiment of the present invention.

FIGS. 8A and 8B illustrate linked graphs for an example in which a switch turns on and off a lamp. The switch in this example, however, does not open or close the door. By coincidence, however, an observation is made where the door is opened and the lamp is turned on after turning on the switch. Although the event of door being open has no causality with the switch being turned on (i.e., opening of the door was a coincident), the graph process 230 generates the linked graph of FIG. 8A because the graph processor 230 does not have any information to determine that the door being opened is not related to activation of the switch. In this example, the graph processor 230 assumes that the events are reversible unless observations contradicting the reversibility are observed. Therefore, the action of turning off the switch (tag: A+) is positively correlated with the event of door closing (tag: D+) and the event of lamp turning off (tag: D+). Therefore, the graph processor 230 tags positive correlations to the action of turning on the switch (tag: A−), the event of door opening (tag: D−), and the event of lamp turning on (tag: D−).

The linked graph of FIG. 8A is maintained until additional observations contradicting the correlation or causality of FIG. 8A is obtained.

Subsequently, another observation is made in which the action of turning off the switch (reverse action to turning on the switch) turns off the lamp but the door does not close. This observation is contradictory with the correlations or the causality established by the linked graph of FIG. 8A. Because all of the dynamic variables (on-off, open-close) are not returned to the original state by turning off the switch, the action of turning on the switch is determined irreversible for the event of door opening. Therefore, the correlation or causality of switch and the door is broken by the new observation.

After breaking the causality, the graph processor 230 may tag the events of door closing and door opening to indicate uncertain correlations (indicated by a triangle with U) with the switch being turned on or off. In one embodiment, the graph processor 230 introduces new hypothetical decision points to accommodate the unknown or hidden actions or events that may be associated with opening or closing of the door.

Expanding Linked Graph by Reusing Observations

A linked graph generated using a set of observations may be modified and expanded to cover a different set of observations by using analogy. The data regarding similarity in the set of observations (hereinafter referred to as "analogy data") may be provided manually by a user or automatically by the fact database. For example, the analogy data may be a statement such as "a washing machine is the same as a dishwasher except that the dishwasher washes dishes and has a tray for holding the dishes in the dishwasher."

Figure 9A:
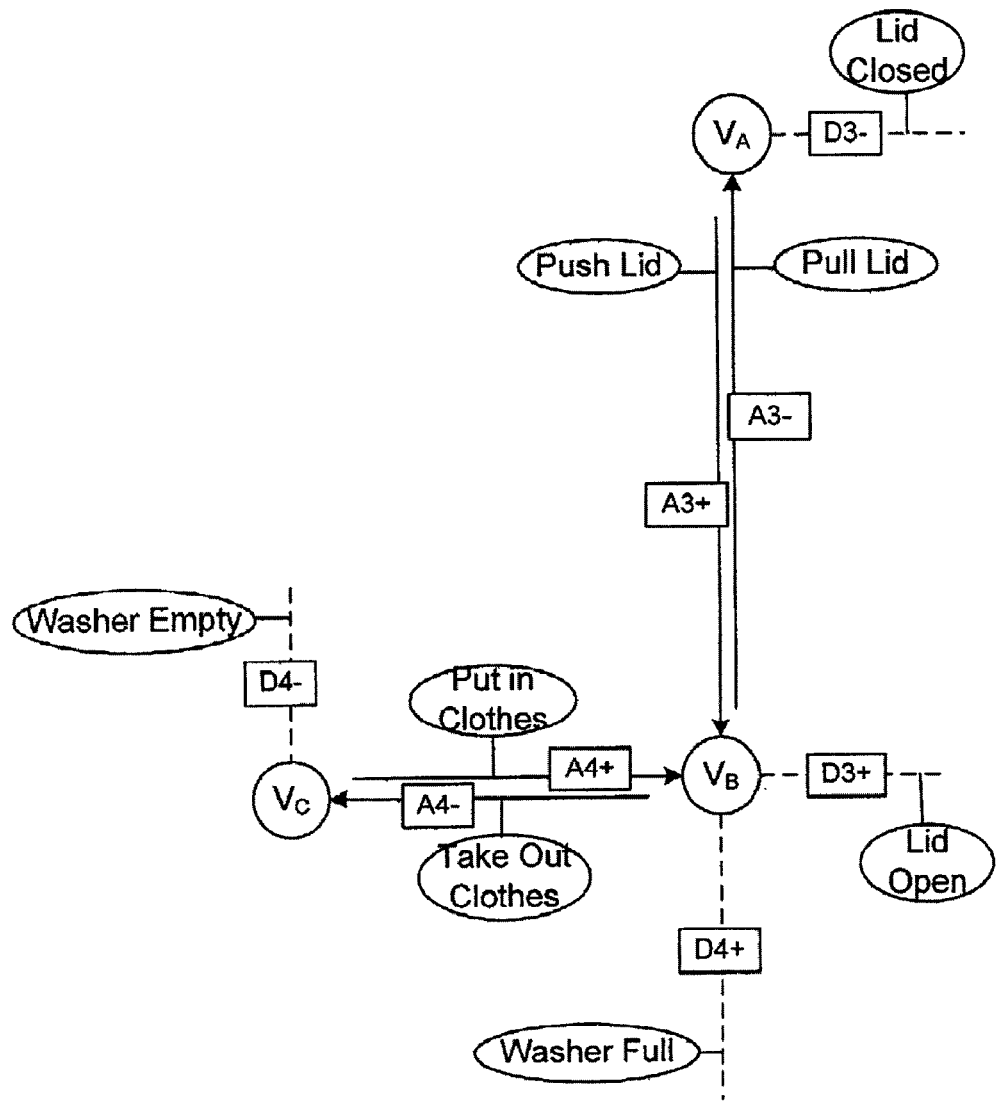
FIG. 9A illustrates a linked graph for observations related to operating of a washing machine, according to one embodiment of the present invention.

FIG. 9A illustrates a linked graph for observations related to operating a washing machine, according to one embodiment of the present invention. The decision points $V_A$ and $V_B$ of the linked graph of FIG. 9A relate to the correlations between the actions of pushing or pulling the lid of the dishing machine to close or open the lid. The decision points $V_B$ and $V_C$ of the linked graph of FIG. 9A relate to the correlations between the actions of putting in the clothes in the washing machine to fill the washing machine or taking out the clothes from the washing machine to empty the washing machine. The linked graph may be generated by making a set of observations using the sensors 110 or by using the fact data provided by the fact database 112.

Figure 9B:
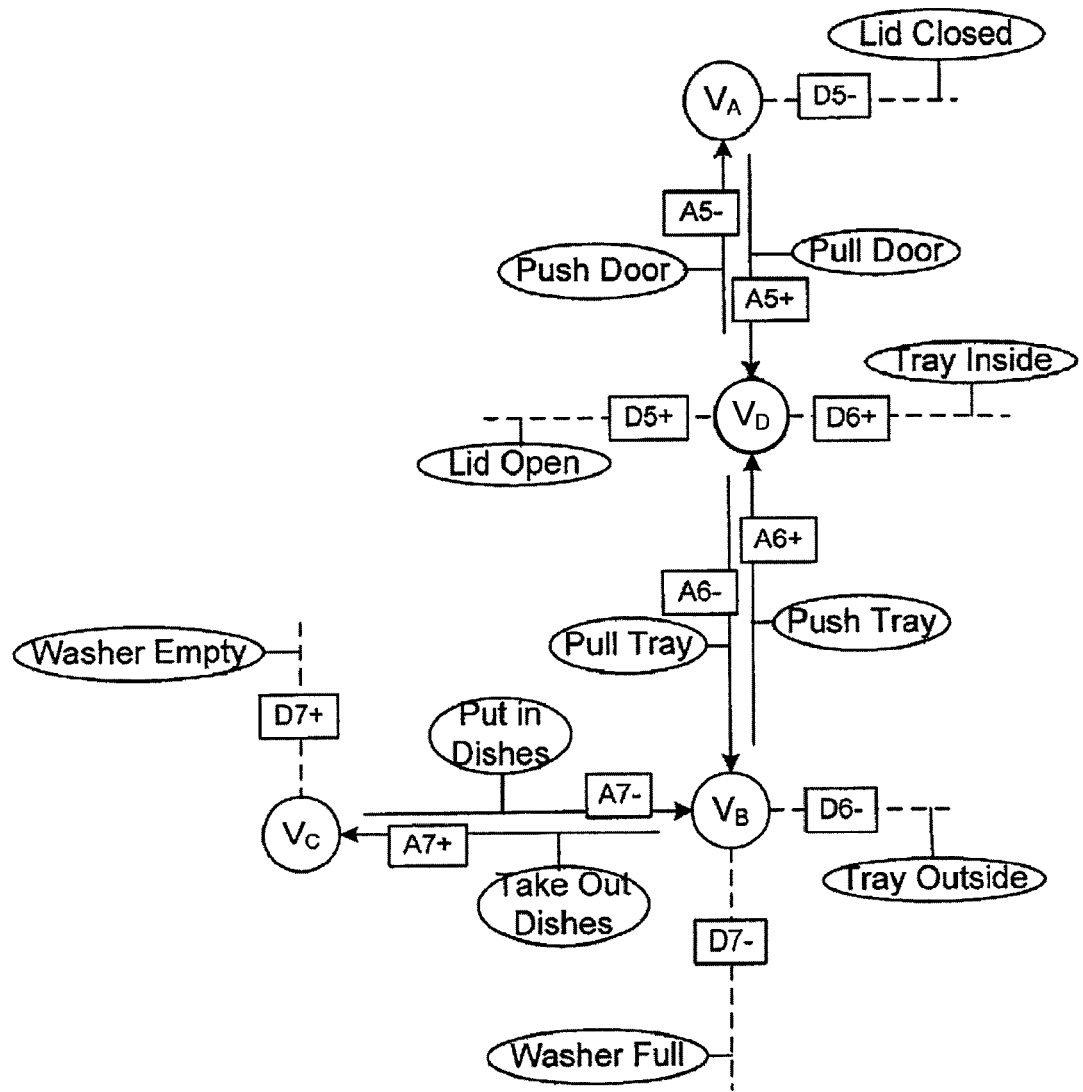
FIG. 9B illustrates a linked graph related to operating of a dishwasher modified and expanded from the linked graph of FIG. 9A, according to one embodiment of the present invention.

FIG. 9B illustrates a linked graph for observations related to operating a dishwasher modified and expanded from the linked graph of FIG. 9A, according to one embodiment of the present invention. Using the analogy data, the linked graph of FIG. 9A may be modified and expanded to cover the dishwasher.

Specifically, a decision point $V_D$ is inserted between the decision points $V_A$ and $V_B$. The decision point $V_D$ is associated with the actions of pushing or pulling the lid to close or open the lid, and the actions of pushing or pulling the tray to place the tray inside or outside the dishwasher. The decision point $V_D$ also includes edges to indicate the event of the lid being open and the event of the tray being placed inside the dishwasher. Also, using the analogy data, the static variable of clothes in the linked graph of FIG. 9A is replaced with the static variable of dishes in the linked graph of FIG. 9B.

The examples of FIGS. 9A and 9B illustrate the expandability of the linked graph using the analogy data. By using such expandability, a linked graph for a set of observation may be used for another set of observations to reduce the computation or storage resources associated with generating linked graphs for different events and actions.

Method of Storing Observations and Using the Stored Observations

Figure 10:
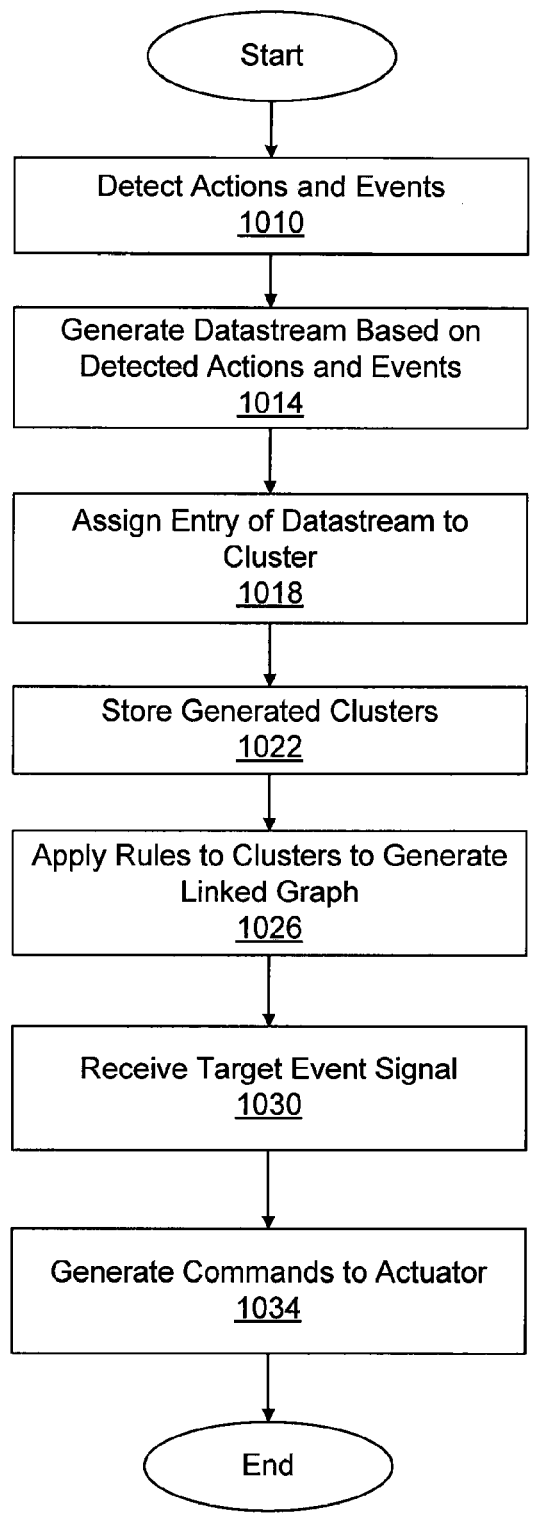
FIG. 10 illustrates a flowchart for the method of generating a linked graph and using the linked graph to operate an actuator, according to one embodiment of the present invention.

FIG. 10 illustrates a flowchart for generating a linked graph and using the linked graph to operate an actuator, according to one embodiment of the present invention. The sensors 110 detect 1010 the actions and events, and generates the sensor signals 114. The sensor signals 114 are fed to the encoder 210 to generate 1014 the datastream 212 based on the detected actions and events. Then the entry of the datastream 212 is assigned 1018 to cluster generator 220 to generate clusters 222.

The generated clusters 222 are stored 1022 in the storage device 250 for retrieval by the graph processor 230. The graph generator 230 then uses the set of rules 232 to generate 1026 the linked graph. After receiving 1030 the target event signal 122, the actuator commands 124 are generated 1034 by the graph processor 230 based on the linked graph to effect changes in the real-world 100. Then the process terminates.

Alternative Embodiments

In one embodiment, the linked graph is generated based only on the fact data provided by the fact database. No observations of the real-world is obtained using the sensors 110. The REM subsystem 120 then uses the linked graph to generate statements regarding the facts in response to a user input.

Although the present invention has been described above with respect to several embodiments, various modifications can be made within the scope of the present invention. Accordingly, the disclosure of the present invention is intended to be illustrative, but not limiting, of the scope of the invention, which is set forth in the following claims.

What is claimed is:

1. A method of storing and using a set of observations of real-world events and actions, the method comprising:
generating clusters based on the set of observations, each cluster representing correlations between events and actions in a subset of the observations in the set of observations;
processing the clusters into a first linked graph based on a set of rules to identify correlations between the events and actions in the set of the observations, the first linked graph tagged to indicate the correlations between the events and the actions based on the set of rules;
presupposing that an event is reversible unless an observation contradicting reversibility of the event is obtained; and
tagging an edge associated with the irreversible event as having uncertain correlations with actions that are irreversible.

2. The method of claim 1, further comprising:
storing the clusters in a storage device; and
outputting an effector signal to an effector responsive to receiving a target event signal intended to cause a real-world event, the effector signal generated based on the first linked graph.

3. The method of claim 1, further comprising:
sensing the events and actions using a sensor; and
classifying and formatting the sensed events and actions into a datastream.

4. The method of claim 1, further comprising receiving from a database fact data structured in natural language to represent correlations between the events and actions.

5. The method of claim 1, wherein each cluster comprises a decision point representing a state where an action can be started, and processing the clusters comprises merging two or more decision points of two or more clusters into one decision point to resolve inconsistencies in the two or more clusters.

6. The method of claim 5, wherein each cluster further comprises an edge associated with the decision point to represent a dynamic variable that changes responsive to performing the action.

7. The method of claim 5, wherein each cluster further comprises an edge associated with the decision point to represent the action that is performed in a time frame where a change in a dynamic variable associated with the decision point is observed.

8. The method of claim 7, wherein generating clusters comprises generating a first cluster and a second cluster responsive to detecting a change in the dynamic variable from a first state to a second state, the first cluster comprising a first edge representing a first action performed in a time frame where the dynamic variable is changed from the second state to the first state, and the second cluster comprising a second edge representing a second action performed in a time frame where the dynamic variable is changed from the first state to the second state.

9. The method of claim 1, further comprising generating a second linked graph for another set of observations by modifying or expanding the first linked graph.

10. The method of claim 1, wherein the subset of observations include one or two observations of the events and actions.

11. A system for storing and using a set of observations of real-world events and actions, the system comprising:
a cluster generator for generating clusters based on the set of observations, each cluster representing correlations between events and actions in a subset of observations in the set of observations; and
a graph processor coupled to the cluster generator for processing the clusters into a first linked graph based on a set of rules to identify correlations between the events and actions, the first linked graph tagged to indicate the correlations between the events and the actions;
wherein the cluster generator presupposes an event as reversible unless an observation contradicting reversibility of the event is obtained, and wherein the graph processor tags an edge associated with the irreversible event as having uncertain correlations with actions that are irreversible.

12. The system of claim 11, further comprising:
a storage device coupled between the cluster generator and the graph processor for storing the clusters generated by the cluster generator;
an interface module coupled to the graph processor to provide a target event signal intended to cause a real-world event; and
a controller for controlling an effector according to commands generated by the graph processor based on the first linked graph to cause the intended real-world event.

13. The system of claim 11, further comprising:
a sensor for sensing real-world events and actions to generate the sensor signals; and
an encoder coupled between the sensor and the cluster generator for formatting the sensor signals into a datastream identifying the events and the actions.

14. The system of claim 13, further comprising a database storing fact data representing correlation between the events and actions causing the real-world events in natural language, the database associated with the graph generator to provide the fact data to the graph generator.

15. The system of claim 11, wherein each cluster comprises a decision point representing a state where an action can be started, and processing the clusters comprises merging two or more decision points of two or more clusters into one decision point to resolve inconsistencies in the two or more clusters.

16. The system of claim 15, wherein each cluster further comprises an edge associated with the decision point to represent a dynamic variable that changes responsive to performing the action.

17. The system of claim 16, wherein each cluster further comprises an edge associated with the decision point to represent the action that is performed in a time frame where a change in a dynamic variable associated with the decision point is observed.

18. The system of claim 17, wherein the cluster generator generates a first cluster and a second cluster responsive to detecting a change in the dynamic variable from a first state to a second state, the first cluster comprising a first edge representing a first action performed in a time frame where the dynamic variable is changed from the second state to the first state, and the second cluster comprising a second edge representing a second action performed in a time frame where the dynamic variable is changed from the first state to the second state.

19. The system of claim 11, wherein the graph processor generates a second linked graph for another set of observations by modifying or expanding the first linked graph.

20. The system of claim 11, wherein the subset of observations include one or two observations of the events and actions.

21. A computer program product comprising a computer readable medium structured to store instructions executable by a processor, the instructions, when executed cause the processor to:
generate clusters based on the set of observations, each cluster representing correlations between events and actions in a subset of the observations in the set of observations;
process the clusters into a first linked graph based on a set of rules to identify correlations between the events and actions in the set of the observations, the first linked graph tagged to indicate the correlations between the events and the actions based on the set of rules;
presuppose that an event is reversible unless an observation contradicting reversibility of the event is obtained; and
tag an edge associated with the irreversible event as having uncertain correlations with actions that are irreversible.

22. The computer program product of claim 21, wherein the subset of observations include one or two observations of the events and actions.

* * * * *